Figure 4:
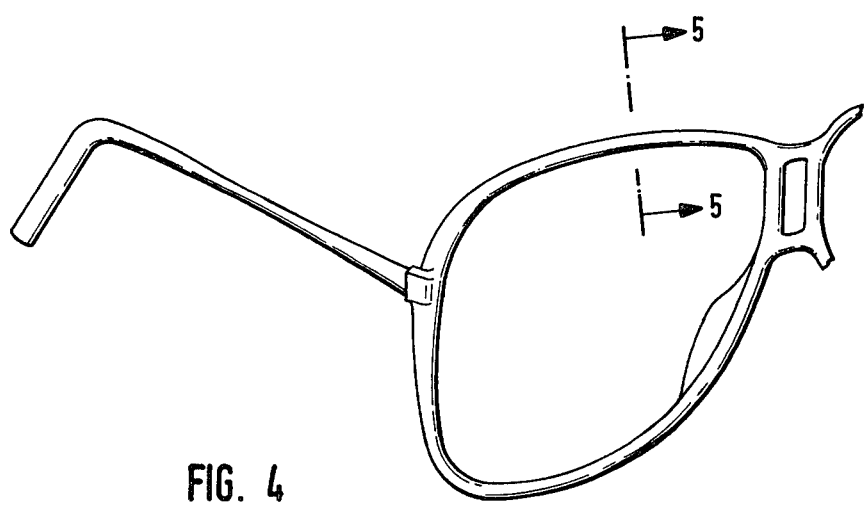

United States Patent [19]

Bononi

[11] 4,302,080

[45] Nov. 24, 1981

[54] EYE GLASSES

[76] Inventor: Walter H. Bononi, Zeppelinstrasse 9, 7012 Fellbach-Schmiden, Fed. Rep. of Germany

[21] Appl. No.: 908,092

[22] Filed: May 22, 1978

[30] Foreign Application Priority Data

May 25, 1977 [DE] Fed. Rep. of Germany ....... 2723538

[51] Int. Cl.³ .......................... G02C 1/00; G02C 5/02
[52] U.S. Cl. ..................................... 351/139; 351/87; 351/132
[58] Field of Search ................. 351/132, 131, 139, 78, 351/83, 87, 126, 136, 88; 2/442, 445, 446

[56] References Cited

U.S. PATENT DOCUMENTS 2,774,279 12/1956 Olson et al. ........................ 351/132
2,997,917 8/1961 Baer ............................... 351/83 UX
4,131,341 12/1978 Bradley .............................. 351/132

FOREIGN PATENT DOCUMENTS 2545683 11/1975 Fed. Rep. of Germany ...... 351/136
215693 5/1924 United Kingdom ................. 351/83

*Primary Examiner*—John K. Corbin
*Assistant Examiner*—Rodney Bovernick

[57] ABSTRACT

Glass frames have a thin basic frame which mechanically absorbs the load on the glasses. A thin layer of soft material, such as silicon rubber or plastic foam is connected to the frame, at least on the rear eyebrow and nose rest and pad portions. The soft material may be separately formed and mechanically connected to the frames or formed on the frames.

9 Claims, 5 Drawing Figures

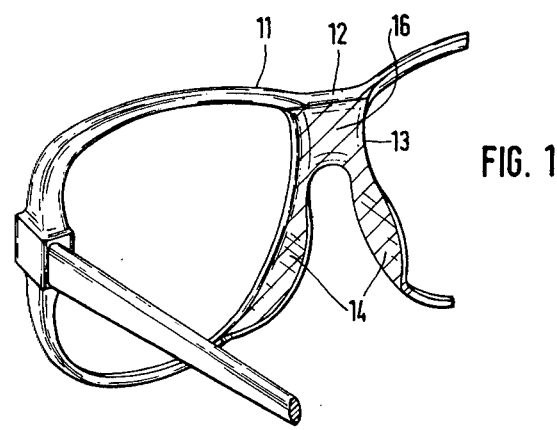
FIG. 1
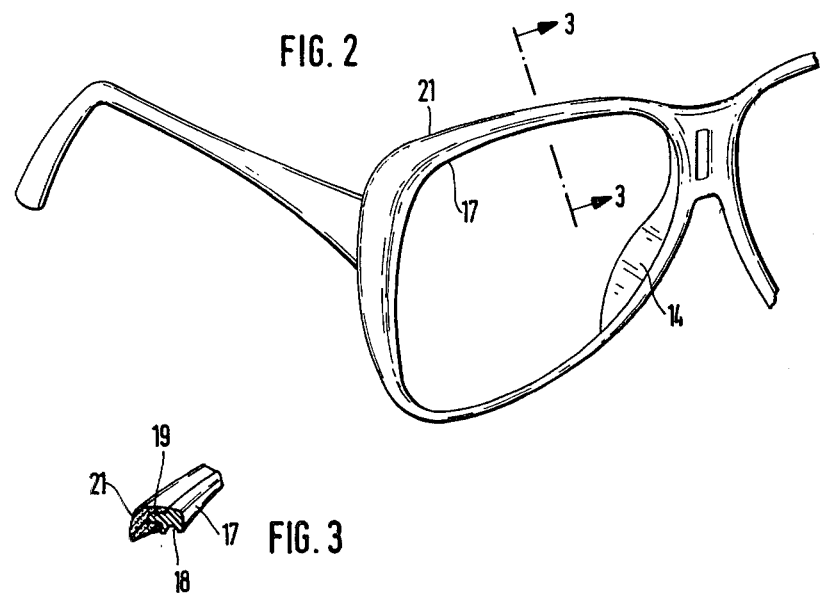
FIG. 2
FIG. 3

EYE GLASSES

The invention relates to a pair of glasses with frames, eye rims, nose rest and pads.

Special glasses such as military glasses, sports glasses, working glasses etc. are not what is understood by glasses of this type. Fashionable glasses of high quality, which have to be worn in daily life are rather more what is meant. Such glasses must be light in weight, because otherwise they press against the wearer and their weight adds to the frequently high weight of the eyeglasses. Furthermore, they must allow the designer freedom to manufacture elegant glasses, e.g. for ladies, who continually require thin mountings, or must also make heavy mountings emphasizing the personality possible. Thirdly, such glasses must be able to be mass-produced at a reasonable price with a high standard of quality. Fourthly, such glasses should shift as little as possible, so that the eyeglasses remain in place during rapid movements of the head, that the glasses remain wearable for sport and pressure points are avoided notwithstanding the good seating. Finally, in spite of the aforementioned properties, glasses of this type should cause no injury if at any time a child should knock against the glasses, an obstacle is run into, or something similar happens.

The task of the invention is to outline a new style pair of glasses of the type indicated above, which makes it possible to fulfil all the abovementioned conditions.

According to the invention, this problem is solved in that the eye rims have a thin basic frame which mechanically absorbs the large loading forces of the glasses, that a thin layer of soft material is provided on the basic frame, at least on the eyebrow part of the eye rims, that the layer of soft material continues into a back lining of the nose rest and that the pads are composed of the soft material. The layer of soft material checks relative movements of glasses and head which do not have much excess swing. It can be manufactured at a reasonable price, either as a component which is to be fixed subsequently or can be foamed up directly onto the basic frame, cast on, or similarly fixed. The layer of soft material produces a comfortable seating of the glasses without any high specific pressures, because it distributes the pressure. It does this particularly when the glasses receive a jolt. The layer of soft material is specifically light. This means that despite the fact that the basic frame has robust dimensions, the glasses are light in weight. The soft material is so set, that the pad or saddle bar supports with the entire surface when this support surface is loaded with the weight of the glasses frame and the glasses.

Figure 5:
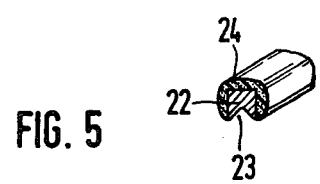

The invention is now described by reference to exemplified embodiments. In these FIG. 1 shows the perspective rear view of a first exemplified embodiment, FIG. 2 shows the perspective front view of a second exemplified embodiment, FIG. 3 shows a section along the line 3—3 in FIG. 2, FIG. 4 shows a perspective front view of a third exemplified embodiment, FIG. 5 shows a cross-section along the line 5—5 in FIG. 4.

In the case of the exemplified embodiment as per FIG. 1, the eye rims 11 and the nose rest 12 are in one piece composed of plastic. Onto the nasal area of the eye rims, onto their reverse side and onto the reverse side and underside of the nose rest 12 is cast a unit 13 of soft foam which has pads 14 connecting via a saddle 16. The nose thereby rests on the pads 14 and the saddle 16. In order that the unit 13 can be seen better, it has been shaded in FIG. 1.

In the case of the exemplified embodiment of FIGS. 2 and 3, the eye rim has the plastic profile 17 which is indicated in FIG. 3. On its inside is provided a glass groove 18 and on its reverse side a tongue 19 is injection-moulded on. This tongue fits into a groove of a soft foam profile 21. This soft foam profile 21 can be provided merely in the eyebrow area of the eye rims or made to run right round. In the case of this construction, it is also possible to make the pads 14 in one piece with the soft foam profile 21.

The soft material is of a flabby nature and comprises silicon rubber. The soft material also may be provided on the inside of the hinge area of the glasses.

In the exemplified embodiment of FIGS. 4 and 5, it is shown that the invention can be realized even with extra-thin frames. Here, the eye glasses are retained by a metal profile 22, which has a glass groove 23. Onto all the surfaces of the metal profile 22, with the exception of the glass groove 23, there is foamed up a foam layer 24, which once again can continue into pads.

As a result of the layer of soft material, the designer can be provided in an inexpensive way with the possibility of manufacturing glasses having a matt finish, such as those which have become known in the form of nickel-plated glasses painted black or olive. The glasses nevertheless have the effects hereinbefore mentioned.

What is claimed is:

1. Glasses comprising means providing freedom for fashionable design and safety for the wearer including
   a nose rest,
   pads,
   eye rims having a thin basic frame comprised of mechanically strong and load absorbing plastic material
   a thin layer of soft and energy absorbing material provided on the basic frame, at least on the reverse side of the eyebrow part of the eye rims, the layer of soft material continuing into a reverse-sided lining of the nose rest,
   the pads being in fixed position and composed entirely of said soft material and without stiffening means, and
   the soft material being of a flabby nature and comprising silicon rubber.

2. Glasses as claimed in claim 1, wherein the eye rims are completely covered by the layer of soft material.

3. Glasses as claimed in claim 2, comprising glass grooves of the eye rims which are free from the layer of soft material.

4. Glasses as claimed in claim 1, wherein the basic frame is covered with the soft material at least on its inside.

5. Glasses as claimed in claim 1, wherein the soft material comprises plastic foam.

6. Glasses as claimed in claim 5, wherein the plastic foam is comprised of closed cells on the outside.

7. Glasses as claimed in claim 1, wherein the soft material is a separate component which is subsequently connected to a form-lacking or adhearing manner to the basic frame.

8. Glasses as claimed in claim 1 comprising grooves in the layer of soft material and tongues on the basic frame which fit into them.

9. Glasses as claimed in claim 1, wherein the layer of soft material is also provided on the inside of the hinge area of the glasses.

* * * * *